United States Patent

[19]

Patel et al.

[11] Patent Number: 6,149,562

[45] Date of Patent: Nov. 21, 2000

[54] MANUAL TOOL CHANGING APPARATUS

[75] Inventors: Himat Patel; Mihai Leahu, both of Zionsville, Ind.

[73] Assignee: Hurco Companies, Inc., Indianapolis, Ind.

[21] Appl. No.: 09/428,074

[22] Filed: Oct. 27, 1999

[51] Int. Cl.$^7$ .............................. B23Q 3/157; A47F 5/00
[52] U.S. Cl. ........................... 483/13; 211/1.53; 483/31; 483/60
[58] Field of Search .................................. 483/31, 30, 28, 483/16, 42, 69, 19, 49, 53, 54, 59, 60, 13; 211/1.53

[56] References Cited

U.S. PATENT DOCUMENTS

| | | |
|---|---|---|
| 3,678,801 | 7/1972 | Hague et al. . |
| 3,684,101 | 8/1972 | Bradford et al. ...................... 211/1.53 |
| 3,724,056 | 4/1973 | Antal . |
| 3,844,028 | 10/1974 | Hague et al. . |
| 4,335,498 | 6/1982 | Hague et al. ............................. 403/49 |
| 4,485,549 | 12/1984 | Brolund .................................... 483/28 |
| 4,499,650 | 2/1985 | Cannon et al. .................... 211/1.53 X |
| 4,509,235 | 4/1985 | Sakamoto .................................. 483/54 |
| 4,757,730 | 7/1988 | Porat et al. . |
| 4,961,256 | 10/1990 | Faillace . |
| 5,093,978 | 3/1992 | Binder . |
| 5,095,604 | 3/1992 | Baker . |
| 5,121,661 | 6/1992 | Deplante et al. . |
| 5,148,573 | 9/1992 | Killim et al. .......................... 483/30 X |
| 5,154,686 | 10/1992 | Klarer et al. .............................. 483/59 |
| 5,219,318 | 6/1993 | Vranish ..................................... 483/16 |
| 5,462,511 | 10/1995 | Sheldon et al. .............................. 483/1 |
| 5,684,369 | 11/1997 | Kim . |
| 5,722,141 | 3/1998 | Strickland . |
| 5,884,541 | 3/1999 | Habermehl et al. . |
| 5,908,374 | 6/1999 | Kato ........................................... 483/42 |

*Primary Examiner*—William Briggs
*Attorney, Agent, or Firm*—Baker & Daniels

[57] ABSTRACT

A manually operated apparatus for removal and insertion of a tool holder to and from a tool pocket of a magazine includes two components—a multi-function insertion/removal tool, and a pivot bracket. The multi-function tool generally comprises an elongated bar having a tool holder removal element at one end and an insertion element at the opposite end. The removal element can constitute a known pry tool having a fork portion configured to facilitate insertion between the rim of the tool pocket and the underside of the circumferential flange of the tool holder. The insertion element of the multi-function insertion/removal tool comprises a pivot block and a pressure plate. The pivot block includes a pivot pin projecting therefrom that is configured for pivoting engagement within a channel defined in the pivot bracket. The pivot bracket is mounted to the housing of the tool magazine at a manually accessible location relative to the tool pockets with the open end of the channel facing away from the tool pocket. When the pivot pin of the insertion/removal tool is disposed within the channel of the pivot bracket, the pressure plate is situated over a portion of the circumferential flange of the tool holder when the holder is loosely disposed within the tool pocket. The elongated bar of the tool can be used as a lever arm to pivot the tool about the fulcrum point defined by the pivot pin and pivot bracket. As the elongated bar is manipulated, the pressure plate is pivoted downward, bearing against the circumferential flange of the tool holder with sufficient force to overcome the pocket spring force operating against the knob of the tool holder.

19 Claims, 4 Drawing Sheets

ND CHANGING APPARATUS

MANUAL TOOL CHANGING APPARATUS

BACKGROUND OF THE INVENTION

The present invention concerns an apparatus for changing tools mounted within a tapered tool holder. The invention has particular application for use with an automatic machining center that includes a tool magazine to retain tools for use in subsequent machining operations.

A typical numerically controlled machine tool system includes a machining center having a tool magazine and a tool changing mechanism. The mechanism removes a particular tool from the machining spindle and replaces it with a different tool extracted from the tool magazine. With machining centers of this type, a plurality of machining operations are conducted, which can require a like number of different machine tools. Thus, the tool magazine or rack stores the plurality of tools needed for on-demand usage.

In the development of modern machining centers, considerable focus has been placed on the tool changing mechanism—i.e., the device that extracts a particular tool from the magazine and places it within the operating spinal at the machining location. For instance, the automatic tool changer of Hague et al., is depicted in U.S. Pat. No. 3,844,028, is typical of the automatic tool changing mechanisms.

The tool magazine comes in a variety of forms. Typically, the tools are mounted on a movable component of the magazine that is integrated into the numeric control system of the machining center. The magazine can be controlled to move a desired tool to a pre-determined location to be extracted by the automatic tool changing mechanism. One type of tool magazine is shown in FIG. 1. In particular, a magazine 10 includes a plurality of tool pockets 12 that are configured to firmly grasp a tool holder. The magazine 10 depicted in FIG. 1 is a turret type magazine in which the tool pockets 12 are interconnected by a drive chain 14 or similar pocket positioning mechanism. The chain is wound around a hub 15 and is driven by a motor under direction from the numeric control system. In operation, the drive chain 14 can be incrementally driven to position a specific tool pocket 12 at the tool changing location. The magazine 10 also includes a housing 17 that surrounds and supports the tool pockets 12, the driving mechanism 14 and hub 15.

A typical tool pocket 12 is depicted in FIG. 2. In particular, the pocket is configured to support a tapered tool holder 20. It is understood that the tool holder 20 can engage and support a variety of machine tools, such as drill or a milling bit. The tool holder 20 is of a standard configuration. Specifically, the holder 20 can include a tapered body 22 that can conform to a variety standards, such as the ANSI/DIN standard. For example, the body 22 can be a 20, 25, 30, 45, 50 or a 60 taper. The tool holder 20 terminates at one end in an enlarged retention knob 21. At the opposite end, the holder defines a flange 23 that can be engaged by the automatic tool changing mechanism to extract the tool holder 20 from the tool pocket 12 and engage the holder in the machining spindle.

The tool holder 20 is retained within the tool pocket 12 by a mechanism configured to engage the retention knob 21. In a typical system, a plurality of retention balls 27 are held within radial bores that intersect the interior of the pocket. More particularly, the retention balls 27 contact the retention knob 21 of the tool holder 20. Each retention ball 27 is held in position by a retention spring 28 disposed within the radial bore. The retention springs 28 are calibrated to provide a particular spring force (acting in the direction of the arrows) bearing against the retention knob 21 of the tool holder 20. This retention force must be overcome to remove the tool holder 20 from the pocket 12. Likewise, the spring force must be overcome to push the tool holder 20 into the pocket and past the retention balls 27. Of course, the force required to push in or pull out the tool holder is a function of the force required to compress the retention springs 28 as the retention balls 27 are pushed aside by the knob 21.

It is this push-in/insertion and pull-out/extraction force that is addressed by the present invention. More specifically, for larger taper tool holders 20, such as 45 taper and beyond, the retention spring force generated by the retention springs 28 is too strong to be manually overcome. Even smaller ANSI/DIN tapers can also be very difficult to overcome by manual manipulation of the tool holder 20. One complication is that the tool holders 20 can themselves be very heavy, in some instances weighing as much as 35 pounds. Thus, even if the retention spring force could be manually overcome, the weight of the tool holder 20 makes it unwieldy and difficult to manipulate.

In some machining center installations, the particular tools are changed within the magazine relatively infrequently. However, in higher production facilities, a machine operator may be regularly required to remove a tool holder from the magazine and insert a new tool holder. For instance, the machining tool itself may break, obviously requiring replacement. In addition, program modifications to the numerically controlled machining sequence may necessitate tool changes. When smaller machines are used, the magazine may not have the capacity to hold enough different tools to complete a particular machining sequence. In all of these instances the machine operator must be able to readily change out a particular tool from the magazine 10.

Thus far, no adequate apparatus is available that allows ready and easy change-out or replacement of machine tools within a magazine. In one prevalent approach, the machine operator simply cycles the requisite tool through the automatic tool changer operation. With this approach, the operator uses the tool changer to extract the target tool holder 20 from the magazine 10 and carry it over to the machine spindle. The tool holder can then be removed from the spindle by the operator and replaced with another tool holder, after which the automatic tool changer then returns the new holder to the magazine. Of course, this procedure requires significant down time because the machining spindle is used to effect the tool change, taking the machining center temporarily out of production.

An optimum approach would be to permit manual replacement of particular tools within a magazine. A further optimum condition would be to permit tool changes while the machining center is performing its machining function. In most numerically controlled machines, the tool magazine is isolated from the machining location, and can be shielded even further to protect the operator as he accesses the magazine, so this simultaneous activity can be accommodated.

SUMMARY OF THE INVENTION

In order to address these desires, the present invention contemplates a manually operated apparatus for removal and insertion of a tool holder to and from a tool pocket of a magazine. In accordance with the invention, the tool holder can be a standard tapered holder having a tapered cylindrical portion engaged with the tool pocket. The tool holder also includes an enlarged flange that abuts the rim of the tool pocket when the holder is mounted therein.

The invention contemplates two components—a multi-function insertion/removal tool, and a pivot bracket. The multi-function tool generally comprises an elongated bar having a tool holder removal element at one end and an insertion element at the opposite end. In the preferred embodiment, the removal element can constitute a known pry tool having a fork portion configured for contacting the cylindrical portion of the tool holder. The fork portion can have a tapered edge to facilitate insertion between the rim of the tool pocket and the underside of the circumferential flange of the tool holder. Once the fork portion is fully situated between the flange and tool pocket, the elongated bar can be used as a lever arm to pry the tool holder out of the pocket, against the retention force of the retention ball and spring mechanism in the pocket. Preferably, the pry tool is angled adjacent to the fork portion to provide clearance between the insertion/removal tool and the structure of the tool magazine for removal of the tool holder.

The insertion element of the multi-function insertion/removal tool comprises a pivot block and a pressure plate. The pivot block includes a pivot pin projecting therefrom that is configured for pivoting engagement within a channel defined in the pivot bracket. In accordance with a further aspect of the invention, the pivot bracket is mounted to the housing of the tool magazine at a convenient and manually accessible location relative to the tool pockets. The pivot bracket is mounted so the open end of the channel faces away from the tool pocket. With this configuration, the pivot pin of the insertion/removal tool can be easily lodged within the channel.

When the pivot pin of the insertion/removal tool is disposed within the channel of the pivot bracket, the pressure plate is situated over the rim of the tool pocket. More specifically, a ledge of the pressure plate is oriented over a portion of the circumferential flange of the tool holder when the holder is loosely disposed within the tool pocket. When the insertion/removal tool is in this position, the elongated bar of the tool can be used as a lever arm to pivot the tool about the fulcrum point defined by the pivot pin and pivot bracket. Thus, as the elongated bar is pivoted outward (away from the tool magazine), the pressure plate is pivoted downward, bearing against the circumferential flange. The lever arm provided by the fulcrumed tool magnifies the manual force applied by the operator sufficient to overcome the retention spring force operating against the knob of the tool holder.

One object of the present invention is to provide a manually usable tool to accomplish insertion and removal of a tool holder from a tool pocket. Another object is to provide a tool that can readily overcome the significant spring force used to hold the tool holder within the tool pocket.

One benefit of the invention is that a single apparatus provides both removal and insertion functions. Another significant benefit is that the tool can be manually operated, thereby eliminating the need for prior approaches that rely upon the automatic tool changer of the machining center. A further benefit achieved by the present invention is that the apparatus can be mounted with the tool magazine, isolated from the machining station of the center.

Other objects and benefits of the invention can be readily discerned from the following written description and accompanying figures.

DESCRIPTION OF THE PREFERRED EMBODIMENTS

Figure 1:
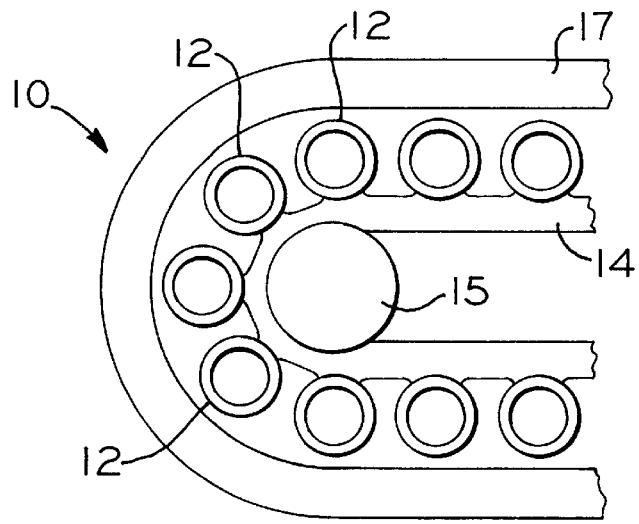
FIG. 1 is a side elevational view of a tool magazine for an automatic machining center.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alternations and further modifications in the illustrated devices and described methods and further applications of the principles of the invention which would normally occur to one skilled in the art to which the invention relates.

The present invention concerns a tool insertion/removal apparatus particularly suited for use with an automatic machining center. More particularly, the apparatus includes a multi-function tool and a pivot bracket mounted to the housing of the tool magazine. The multi-function tool is in the form of an elongated bar having a removal component at first end that is configured for prying a tool holder free from its engagement within a tool pocket. The tool also includes an insertion component at its opposite end that is configured to mate with the pivot bracket mounted on the magazine housing. The tool can then be manipulated to pivot about the pivot bracket and apply a restoring force to the tool holder to push the holder into the pocket of the tool magazine. Although the invention finds its greatest application in connection with a tool magazine, it can be equally suited for use as an insertion and removal tool for a single tool machine.

Figure 2:
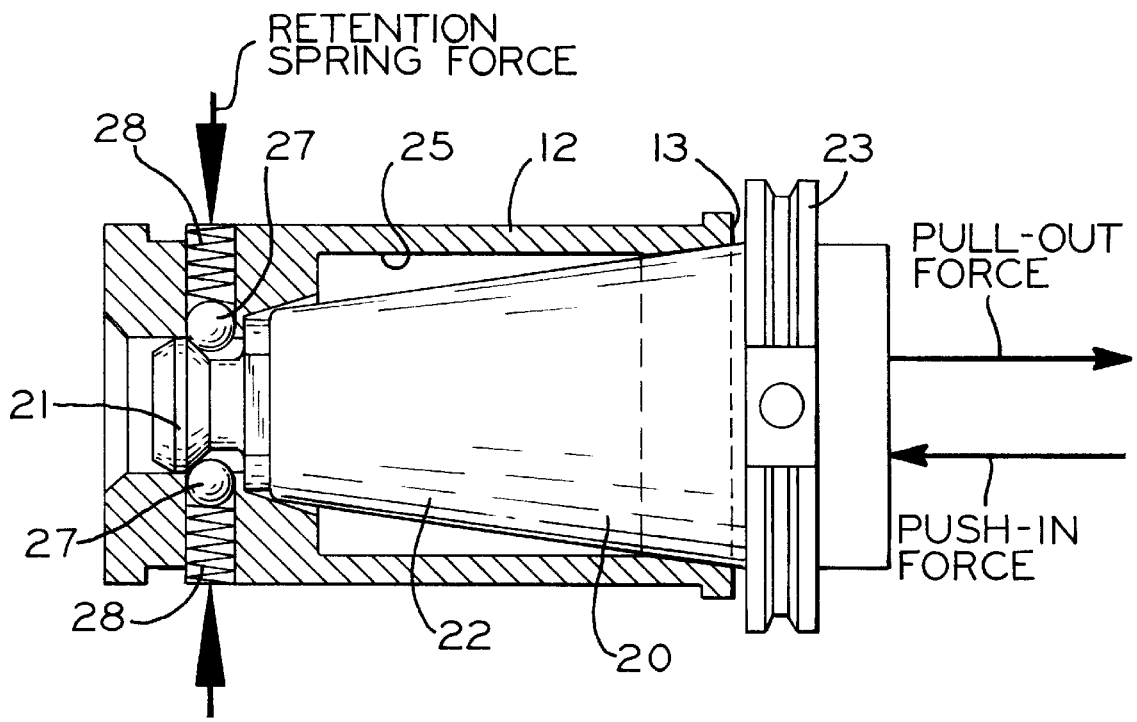
FIG. 2 is a side partial cross-sectional view of a tool pocket forming one component of the tool magazine shown in FIG. 1.
Figure 3:
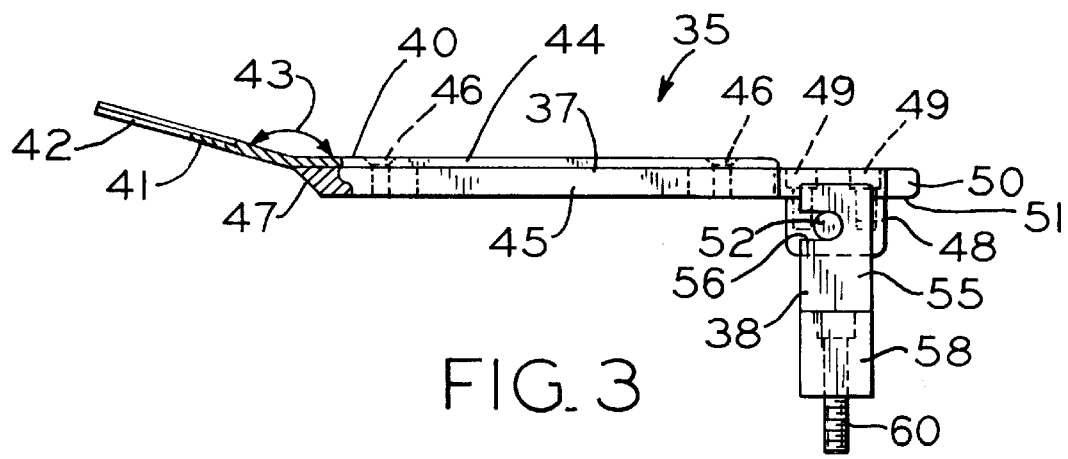
FIG. 3 is a side partial cross-sectional view of a tool insertion/removal apparatus according to one embodiment of the present invention.
Figure 4:
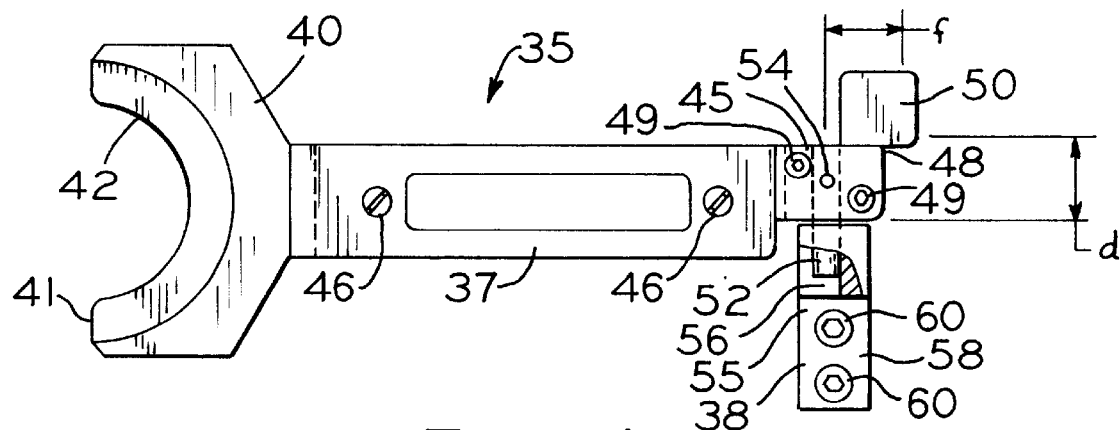
FIG. 4 is a top elevational view of the apparatus shown in FIG. 3.

In accordance with a preferred embodiment of the invention, an insertion/removal apparatus 35 includes an elongated tool 37 and a pivot bracket 38, as depicted in FIGS. 3 and 4. The elongated tool 37 is preferably formed by the combination of a pry-tool 40 and a lever arm 45. The pry-tool 40 can be of a known design for use in prying a tool loose from a tool socket. Preferably, the tool 40 includes a fork portion 41 that defines a tapered circumferential edge 42. The fork portion 41 can seat against a cylindrical portion of a tool holder, such as holder 20. Preferably, the fork portion 41 and tapered edge 42 are sized and configured to fit between the rim 13 of the tool pocket 12 (see FIG. 2) and the underside of the circumferential flange 23 of the tool holder 20. The fork portion 41 of the pry-tool 40 is oriented at an angle 43 relative to the elongated body 44 of the tool. This angle is preferably dimensioned for clearance reasons—namely to permit clearance between the pry-tool 40 and the housing 17 of the tool magazine 10 (see FIG. 1). This angle in the pry-tool 40 allows the fork portion 41 to be engaged about the tool holder 20 and still leave room for the operator to manually leverage the pry-tool 40 to dislodge the tool holder 20.

In accordance with the preferred embodiment of the invention, the pry-tool 40 is mounted to an elongated lever arm 45. The pry-tool 40 can be connected to the lever arm 45 by way of mounting screws 46. The end 47 of the lever arm 45 adjacent the fork portion 41 can be beveled or angled, again to provide clearance relative to the tool pocket 12 and housing 17 of the tool magazine 10. This clearance allows the lever arm 45 and pry-tool 40 to be pivoted enough to cause the tool holder 20 to be dislodged from the tool pocket 12.

The lever arm 45 is attached at one end to a pressure plate 50. The pressure plate 50 defines a ledge surface 51 that is configured and sized to engage the circumferential flange 23 of the tool holder 20 (see FIG. 2). The insertion/removal tool 37 further includes a pivot block 48 with a pivot pin 52 projecting outwardly from the block 48 at a substantially right angle. The pivot pin 52 mates with the pivot bracket 38 as described in more detail below. In the preferred embodiment, the pivot pin 52 projects from an opposite side of the lever arm 45 relative to the pressure plate 50.

Figure 5:
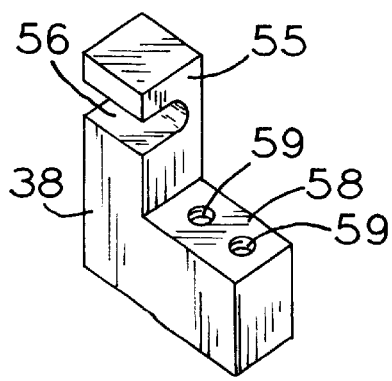
FIG. 5 is an enlarged prospective view of a pivot bracket component of the apparatus shown in FIGS. 3 and 4.

With specific reference to FIG. 5, the pivot bracket 38 can include a pivot portion 55 and a mounting portion 58. A number of screw bores 59 are defined in the mounting portion for receiving mounting screws 60 therein, as depicted in FIGS. 3 and 4. The mounting screws can be threaded into holes tapped into the housing 17 of the tool magazine 10 to affix the mounting portion 58 to the housing 17. In the preferred embodiment, the pivot block 38 is generally L-shaped between the pivot portion 55 and the mounting portion 58. The pivot portion 55 further defines a channel 56 that extends substantially parallel to the longitudinal axis of the mounting portion 58. The channel 56 is sized to permit sliding and pivoting access to the pivot pin 52. Preferably, the pivot pin 52 has a circular cross-section, and the channel 56 is configured at its closed end to conform to the cross-section of the pin. Thus, the pivot pin 52 can rest within the channel 56 of the pivot portion 55, as shown best in the top view of FIG. 4.

Figure 6:
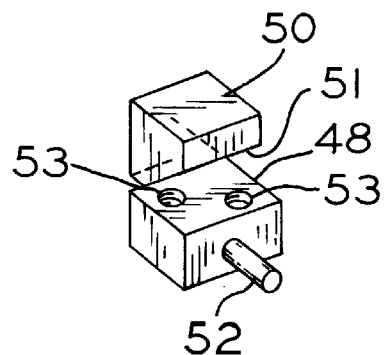
FIG. 6 is an enlarged perspective view of a pivot block component of the apparatus shown in FIGS. 3 and 4.

In the illustrated embodiment, the pivot block 48 carrying the pivot pin 52 can be separately mounted to the elongated lever arm or bar 45. More specially, the block 48 can include at least two threaded bores 53 that coincide with non-threaded bores formed at the one end of the lever arm 45. Mounting screws 49 can be provided to engage the pivot block 48 to the end of the lever arm 45. The pivot pin 52 can be a separate pin that is engaged within a bore defined in the pivot block 48. The pin can either be press fit into place or locked into place with a separate fixation screw, such as screw 54 shown in FIG. 4. Preferably, the pressure plate 50 and pivot block 48 are formed of one piece, as depicted in FIG. 6. In addition, the entire insertion/removal tool 37 can be formed of a single piece. The tool 37 must be formed of a material that is sufficiently strong to withstand the bending moments applied to it when used to insert of remove a tool holder. Preferably, the tool 37 is formed of steel.

Figure 7:
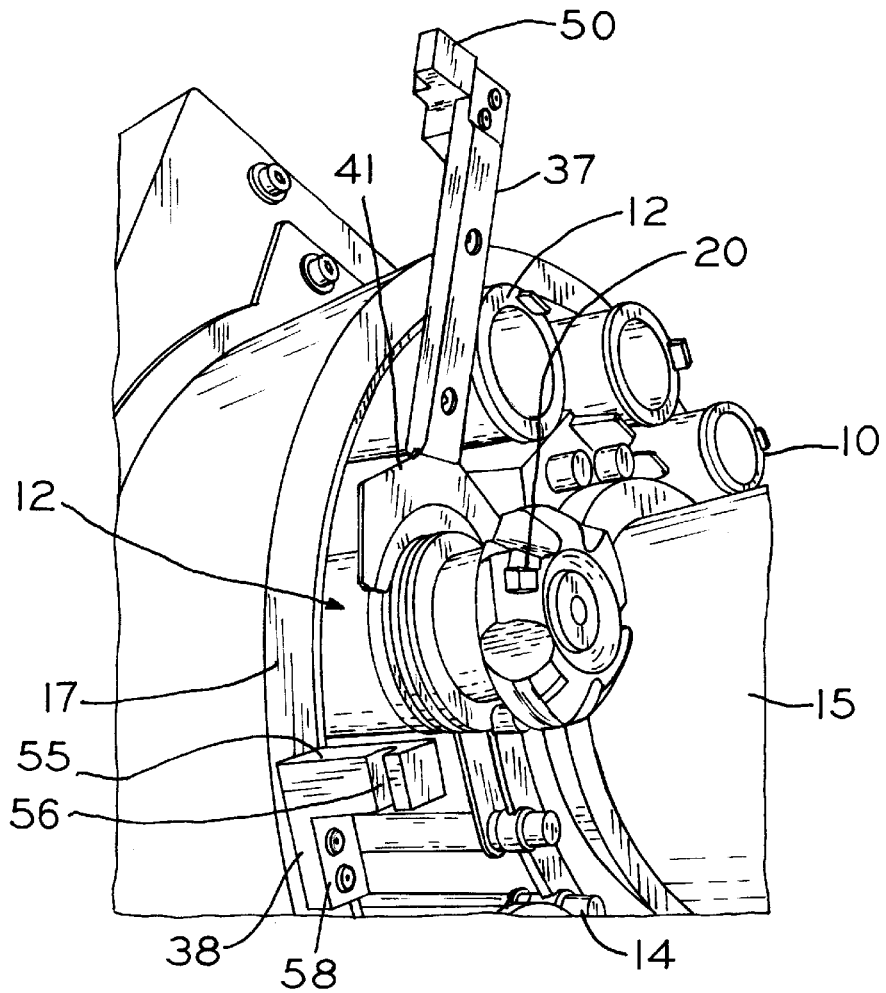
FIG. 7 is a perspective pictorial representation of the apparatus shown in FIGS. 3 and 4 mounted on a tool magazine and in use for removing a tool holder from a tool pocket.
Figure 8:
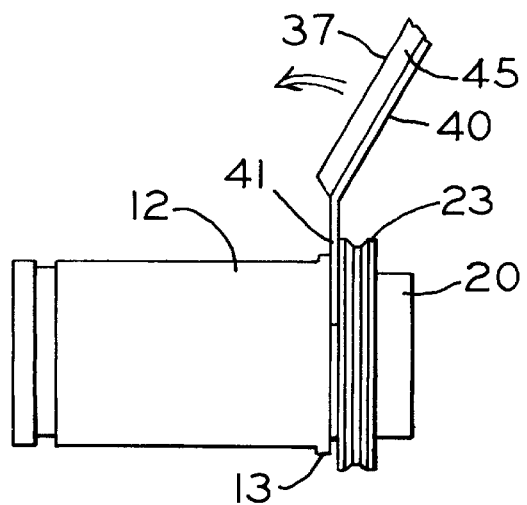
FIG. 8 is a side elevational view of the arrangement of the insertion/removal tool in position to dislodge a tool holder from the tool pocket.

The use of the insertion/removal apparatus 35 as depicted with references to FIGS. 7–10. Referring first to FIGS. 7 and 8, use of the insertion/removal tool 37 to dislodge a tool holder 20 from a tool pocket 12 is shown. When used in this manner, the fork portion 41 of the pry-tool 40 is situated between the flange 23 of the tool holder 20 and the rim 13 of the tool pocket 12. Since the fork portion 41 has a tapered circumferential edge 42, the taper can help initially separate the flange 23 from the pocket rim 13 until the fork portion 41 is fully disposed between the two components. The tool holder 20 can then be removed by simply pivoting the tool 37 in the direction of the arrow shown in FIG. 8.

In discussing the use of the apparatus 35 for insertion of a tool holder, the orientation of the pivot bracket 38 of the insertion/removal apparatus 35 is best understood with reference to FIG. 7. It can be seen that the mounting portion 58 is preferably mounted to the housing 17 of the tool magazine 10 so that the L-shape follows the circumference of the housing 17. In this orientation, the pivot portion 55 projects upward or away from the housing 17. Moreover, the pivot portion 55 is oriented so that the channel 56 faces away from the tool magazine 10.

Figure 9:
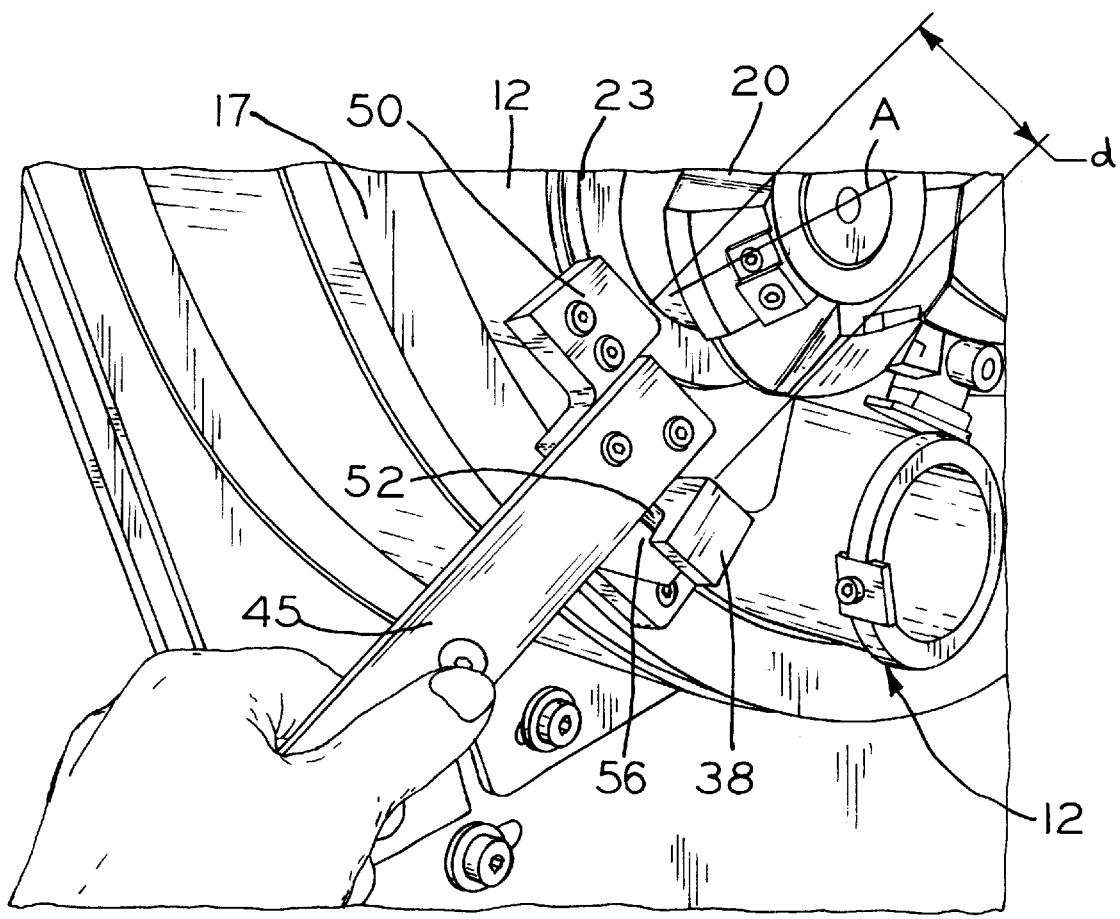
FIG. 9 is a perspective pictorial representation of the insertion/removal apparatus of FIGS. 2 and 3 used to push a tool holder into a tool pocket.
Figure 10:
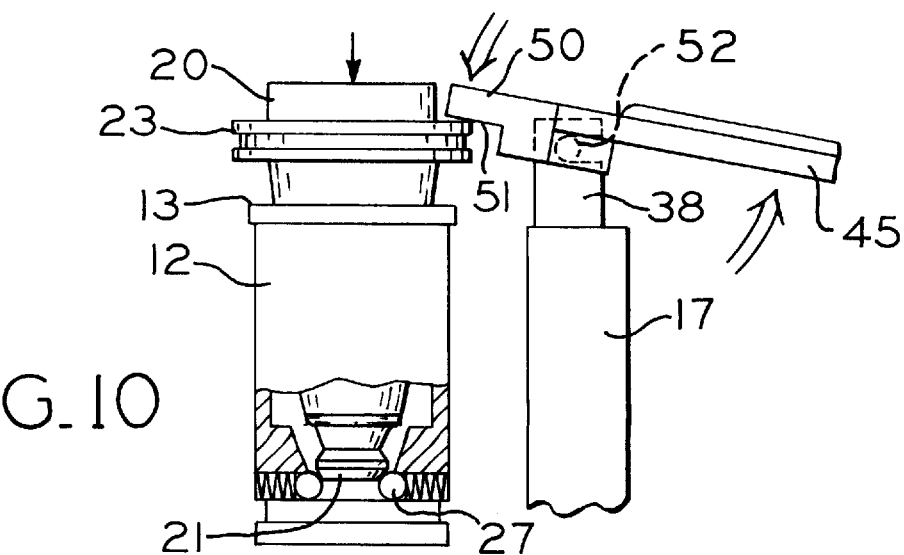
FIG. 10 is a side partial cross-sectional view of the manner of using the insertion/removal apparatus to push a tool holder into a tool pocket.

Insertion of a tool holder 20 using the insertion/removal apparatus 35 of the present invention is depicted in FIGS. 9 and 10. It can be seen that the opposite end of the insertion/removal tool 37 (i.e.—opposite from the fork portion 41) is now used to apply pressure to the tool holder 20 to push it into the tool pocket 12. More specifically, the pivot pin 52 is lodged within the channel 56 of the pivot bracket 38. Since the channel 56 opens outward from the tool magazine 10, it is very easy for the operator holding the lever arm 45 to introduce the pin into the channel.

As a further feature of the insertion/removal apparatus 35, the pivot bracket 38 is mounted to the housing 17 offset from the radial axis A of the tool holder 20. More particularly, the axis A originates at the hub of the tool holder 20 and intersects a point on the flange 23 that is closest to the housing 17. In order to obtain the maximum mechanical advantage—i.e., fulcrum arm—the pivot bracket 38 is offset a distance d, as depicted in FIG. 9, from the intersection of the axis A with the flange 23. This distance d corresponds to the distance from the pivot pin 52 to the pressure plate 50. This offset distance d allows the removal tool 37 to maintain the fulcrum distance f, as illustrated in FIG. 4. In the preferred embodiment, the fulcrum distance f corresponds to the distance from the pivot pin a portion of the pressure plate 50 that contacts the tool holder flange. Preferably, pressure plate projects beyond the end of the lever arm 45 parallel to the longitudinal axis of the arm. This fulcrum distance f, in combination with the length of the lever arm 45, provides the mechanical advantage necessary to push even a large taper tool holder 20 into a tool pocket 12.

As depicted in FIG. 10, an upward movement of the lever arm 45 causes the removal tool 37 to pivot about the pivot pin 52 lodged within the pivot bracket 38. This upward movement of the lever arm 45 produces a commensurate downward movement of the pressure plate 50 so that the ledge surface 51 contacts the flange 23 of the tool holder 20. This downward movement causes tool holder 20 to move downward against the force of the retention mechanism 27 within the tool pocket 12.

In the preferred embodiment, the distance d is in the range of 5–10 millimeters. The fulcrum dimension f is preferably between about 3–5 mm. The length of the lever arm 45 as measured from the fork portion 41 to the axis of the pivot pin 52 is preferably about 250 mm. The ratio of the length of the lever arm to the fulcrum distance f provides the measure of the mechanical advantage generated by the insertion/removal tool 37.

In view of the foregoing description, it can be appreciated that the present invention provides a single multi-function apparatus that facilitates manual removal of a tool holder from a tool pocket as well as manual insertion of the holder into the pocket. The combination of the pivot bracket 38 and the pivot block 48 of the insertion/removal tool 37 allows the operator to manually support the tool holder while manipulating the tool 37. The tool is configured so that sufficient force can be applied through the pressure plate 50 onto the circumferential flange of the tool holder when the operator uses one arm to pivot the tool.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. An apparatus for removal and insertion of a tool holder relative to a tool pocket supported within a housing of a machining center, in which the tool holder defines a circumferential flange disposed adjacent the tool pocket when the tool holder is mounted therein, said apparatus comprising:
   a removal/insertion tool including;
      an elongated bar having opposite ends;
      a pry member attached at one end of said elongated bar, said pry member configured for placement between the flange of the tool holder and the tool pocket when the tool holder is mounted therein, whereby said elongated bar is manually manipulable to cause said pry member to separate the tool holder from the tool pocket;
      a pressure member attached at an opposite end of said elongated bar, said pressure member sized to apply a force to the circumferential flange of the tool holder; and
      a pivot pin extending from said elongated bar between said pressure member and said one end of said elongated bar; and
   a pivot bracket defining a pivot channel configured to removably receive said pivot pin therein, wherein said pivot bracket is sized for mounting to the housing of the machining center such that said pressure member contacts the circumferential flange of the tool holder when the pivot pin is disposed within said pivot channel, whereby said pivot pin and pivot bracket define a fulcrum about which said elongated bar can be manually pivoted to apply a force from said pressure member to the circumferential flange of the tool holder.

2. The apparatus for removal and insertion of a tool holder according to claim 1, wherein said pry member is forked and includes an arcuate edge complementary with an outer dimension of the tool holder adjacent the flange.

3. The apparatus for removal and insertion of a tool holder according to claim 1, wherein said elongated bar defines opposite sides at said opposite end, and said pressure member is attached adjacent one side and the pivot pin extends from the opposite side of said bar.

4. The apparatus for removal and insertion of a tool holder according to claim 1, wherein said elongated bar defines a longitudinal axis between said one end and said opposite end, and said pressure member projects beyond said opposite end substantially parallel to said longitudinal axis.

5. The apparatus for removal and insertion of a tool holder according to claim 4, wherein said elongated bar defines opposite sides at said opposite end, and said pressure member is attached adjacent one side and the pivot pin extends from the opposite side of said bar.

6. The apparatus for removal and insertion of a tool holder according to claim 1, wherein said pivot bracket includes:
   a mounting portion sized for mounting to the housing; and
   a pivot portion attached to said mounting portion to form an L-shape.

7. The apparatus for removal and insertion of a tool holder according to claim 6, wherein said pivot portion defines opposite side faces, with said pivot channel defined in one side face, with the opposite side face oriented toward the tool pocket when said pivot bracket is mounted to the housing.

8. A tool changing assembly for supporting a plurality of tool holders for removal and replacement within a machining center, in which each tool holder defines a circumferential flange, said tool change assembly comprising:
   a plurality of tool pockets, each configured to grippingly receive a corresponding tool holder with the circumferential flange disposed adjacent the tool pocket;
   a housing supporting and surrounding the plurality of tool pockets;
   a removal/insertion tool including;
      an elongated bar having opposite ends;
      a pry member attached at one end of said elongated bar, said pry member configured for placement between the flange of the tool holder and the tool pocket when the tool holder is mounted therein, whereby said elongated bar is manually manipulable to cause said pry member to separate the tool holder from the tool pocket;
      a pressure member attached at an opposite end of said elongated bar, said pressure member sized to apply a force to the circumferential flange of the tool holder; and
      a pivot pin extending from said elongated bar between said pressure member and said one end of said elongated bar; and
   a pivot bracket mounted to said housing and defining a pivot channel configured to removably receive said pivot pin therein, whereby said pivot pin and pivot bracket define a fulcrum, when said pivot pin is disposed within said pivot channel, about which said elongated bar can be manually pivoted to apply a force from said pressure member to the circumferential flange of the tool holder.

9. The tool changing assembly according to claim 8, wherein said pry member is forked and includes an arcuate edge complementary with an outer dimension of the tool holder adjacent the flange.

10. The tool changing assembly according to claim 8, wherein said elongated bar defines opposite sides at said opposite end, and said pressure member is attached adjacent one side and the pivot pin extends from the opposite side of said bar.

11. The tool changing assembly according to claim 8, wherein said elongated bar defines a longitudinal axis between said one end and said opposite end, and said pressure member projects beyond said opposite end substantially parallel to said longitudinal axis.

12. The tool changing assembly according to claim 11, wherein said elongated bar defines opposite sides at said opposite end, and said pressure member is attached adjacent one side and the pivot pin extends from the opposite side of said bar.

13. The tool changing assembly according to claim 8, wherein said pivot bracket includes:
   a mounting portion sized for mounting to the housing; and
   a pivot portion attached to said mounting portion to form an L-shape.

14. The tool changing assembly according to claim 13, wherein said pivot portion defines opposite side faces, with said pivot channel defined in one side face, with the opposite side face oriented toward the tool pocket when said pivot bracket is mounted to the housing.

15. An apparatus for insertion of a tool holder relative to a tool pocket supported within a housing of a machining center, in which the tool holder defines a circumferential flange disposed adjacent the tool pocket when the tool holder is mounted therein, said apparatus comprising:
   an elongated bar having a pressure member attached at one end thereof, said pressure member sized to apply a force to the circumferential flange of the tool holder;
   a pivot pin extending from said elongated bar adjacent said one end of said elongated bar; and
   a pivot bracket defining a pivot channel configured to removably receive said pivot pin therein, wherein said pivot bracket is sized for mounting to the housing of the machining center such that said pressure member contacts the circumferential flange of the tool holder when the pivot pin is disposed within said pivot channel, whereby said pivot pin and pivot bracket define a fulcrum about which said elongated bar can be manually pivoted to apply a force from said pressure member to the circumferential flange of the tool holder.

16. The apparatus for insertion of a tool holder according to claim 15, wherein said elongated bar defines opposite sides at said opposite end, and said pressure member is attached adjacent one side and the pivot pin extends from the opposite side of said bar.

17. The apparatus for insertion of a tool holder according to claim 15, wherein said elongated bar defines a longitudinal axis between said one end and an opposite end, and said pressure member projects beyond said opposite end substantially parallel to said longitudinal axis.

18. The apparatus for insertion of a tool holder according to claim 15, wherein said pivot bracket includes:
   a mounting portion sized for mounting to the housing; and
   a pivot portion attached to said mounting portion to form an L-shape.

19. The apparatus for insertion of a tool holder according to claim 18, wherein said pivot portion defines opposite side faces, with said pivot channel defined in one side face, with the opposite side face oriented toward the tool pocket when said pivot bracket is mounted to the housing.

* * * * *